Sept. 9, 1924.  1,508,232
F. W. MILOSY
REPAIRMAN'S CREEPER
Filed Nov. 29, 1922
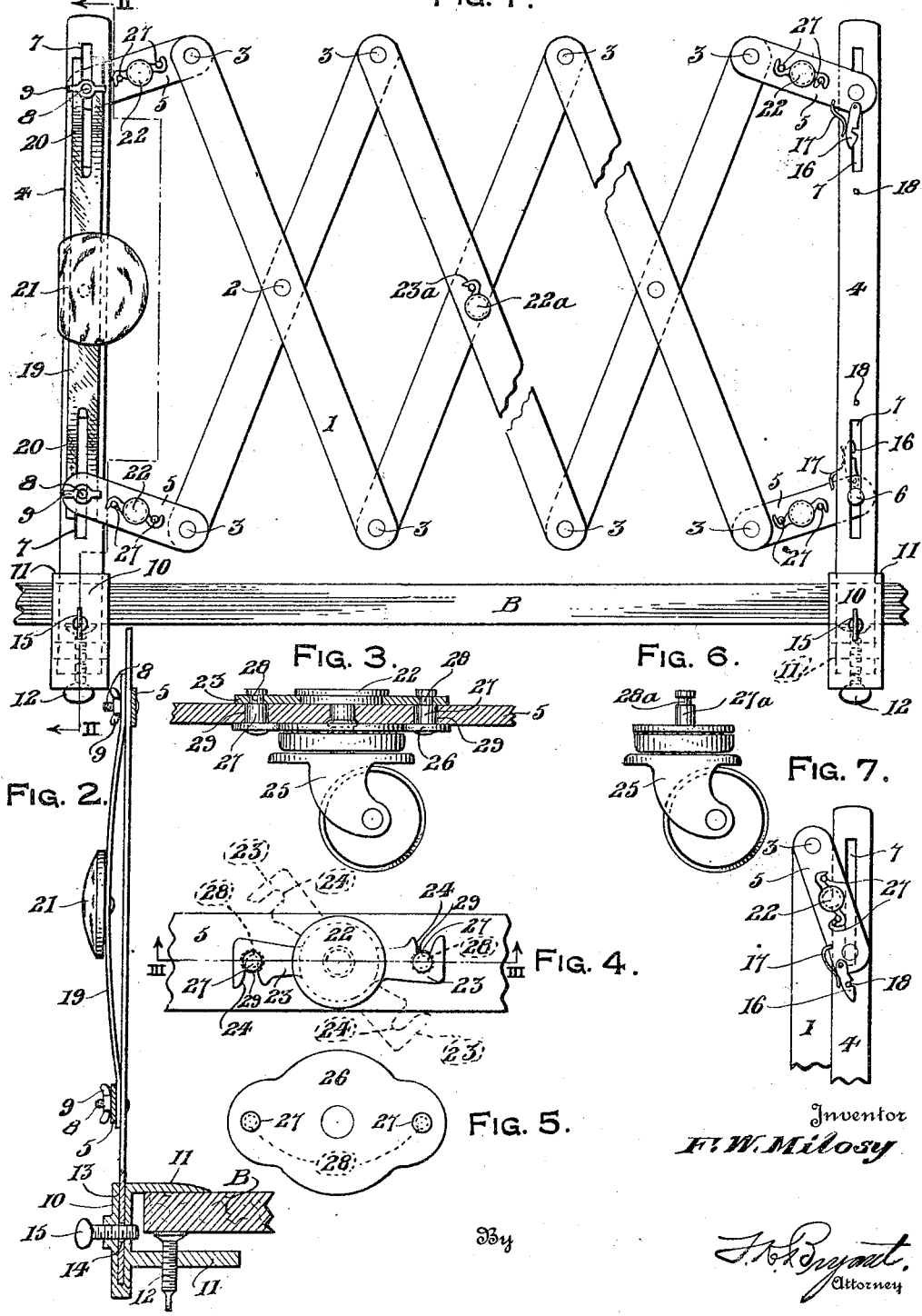

Patented Sept. 9, 1924.

1,508,232

UNITED STATES PATENT OFFICE.

FRANK W. MILOSY, OF MALBA, LONG ISLAND, NEW YORK.

REPAIRMAN'S CREEPER.

Application filed November 29, 1922. Serial No. 603,958.

*To all whom it may concern:*

Be it known that I, FRANK W. MILOSY, a citizen of Hungary, residing at Malba, Long Island, in the county of Queens and State of New York, have invented certain new and useful Improvements in Repairmen's Creepers, of which the following is a specification.

This invention relates to certain new and useful improvements in combined luggage carriers and rests, the luggage carrier being of that type adapted for mounting upon the running board of an automobile, while the rest is employed as a skid to be positioned beneath an automobile for supporting a person while working beneath the automobile.

The primary object of the invention resides in the provision of a combined luggage carrier and rest, the same embodying a fence or guard of lazy tong construction adapted to be mounted upon running boards of different lengths on automobiles, and carrying attaching devices for mounting roller casters that are disengageable therefrom, while a head rest is carried by a vertical end bar of the device.

The invention further embodies in a combined luggage carrier and rest of the type above set forth, the provision of attaching clamps for mounting the luggage carrier upon the running board of an automobile with the carrier detachable from the clamp whereby the latter, if desired, may be permanently carried by the running board.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a fragmentary front elevational view of a combined luggage carrier and rest constructed in accordance with the present invention, the same being illustrated as mounted upon the running board of an automobile, Figure 2 is a vertical sectional view taken on line II—II of Fig. 1 showing the resilient head support for the rest and the clamping device for securing the carrier to the running board of an automobile, Figure 3 is a detail sectional view taken on line III—III of Fig. 4 showing the mounting for one of the casters adjacent the end of the rest, Figure 4 is a fragmentary top plan view of the caster support shown in Fig. 3, and illustrating by dotted lines, the released position of the latch for retaining the caster in position, Figure 5 is a top plan view of the caster supporting plate, Figure 6 is a side elevational view of the caster associated with the central portion of the carrier and rest, and Figure 7 is a fragmentary front elevational view showing the catch device for retaining the carrier in a closed position when employed as a rest.

Referring more in detail to the accompanying drawing, there is illustrated a combined luggage carrier and rest, the device being mounted upon the running board of an automobile when employed as a luggage carrier, and collapsed or closed with roller casters mounted thereon when employed as a rest for use beneath the body of an automobile, and embodies a fence construction including a plurality of bars 1 pivoted together intermediate their ends as at 2, and further pivoted at adjacent ends as at 3 in lazy tong arrangement as shown in Fig. 1. The vertical end bars 4 are connected to the free ends of adjacent cross bars 1 by relatively short links 5, the links 5 adjacent one of the end bars 4 carrying laterally projected headed pins 6 that project through and are freely slidable in longitudinal slots 7 formed in said end bar. The connection between the links 5 at the opposite end of the device include grooves 8 freely extending through the slotted openings 7 for the reception of thumb screws 9 for adjusting the same in set positions as illustrated in Figs. 1 and 2.

The mounting for the luggage carrier includes U-shaped clamps, each associated with the lower end of an end bar 4, the clamp embodying an outer end wall 10 and side legs 11 positioned above and below the running board B as shown in Fig. 2, a clamping screw 12 being threaded through the lower arm 11 for engagement with the board B for anchoring the clamp in position thereon. The end wall 10 of the clamp is provided with a vertical socket 13 within which the lower end of the adjacent end bar 4 is received, the lower end of said bar being provided with an opening 14 while an anchoring screw 15 threaded through the end wall 10 passes through the opening 14 for securing the lazy tong construction of the luggage carrier and the end bars 4 in proper position on the running board B as clearly illustrated.

When the device is to be employed as a rest for use beneath an automobile, the screws 15 are released to permit the end bars 4 to be removed from the clamp members 10, and if desired said clamp members may remain permanently upon the running board of the automobile, or be removed therefrom, the fence construction being collapsed or closed with the end bars 4 moved toward each other in the usual operation of the lazy tong arrangement, and when so positioned, the pins 6 carried by the links 5 are moved toward the inner ends of the slots 7 as shown in Fig. 7, a notched dog 16 pivotally carried by the link 5 and spring pressed as at 17 is moved into engagement with the lug 18 carried upon the adjacent face of the end bar 4, this arrangement locking the device in a closed position against extension thereof.

A head rest is associated with the end bar 4 with which the adjusting screws 8 are associated and embodies a spring plate 19 bifurcated at its ends as at 20 to straddle the screws 8 as shown in Fig. 1, and maintained under proper tension by the wing nuts 9, the central portion of the spring plate 19 carrying a suitable head rest 21 as shown in Figs. 1 and 2.

Roller casters are detachably mounted on the frame structure, each link 5, as shown more clearly in Figs. 3 to 5 having an annularly grooved disk head 22 secured thereto upon which a double latch arm is rotatably mounted, the latch arm including end extensions 23 notched as at 24 upon opposite sides thereof. A roller caster embodying a wheel carrying frame 25 is pivotally supported on a plate 26 that carries a perpendicularly extending pin 27 adjacent each end thereof that has a reduced neck portion 28, the pins 27 projecting upwardly through openings 29 provided in the link 5 with the notched sides 24 of the latch extension 23 engaging the reduced neck portion for locking the caster on said link. A disk head 22ª carried by the centrally positioned cross bar 1 carries a single latch extension 23ª that is engageable in the reduced neck 28ª of the single pin 27ª carried by the caster frame 25, as clearly shown in Figs. 1 and 6, the single caster positioned centrally of the device providing a proper intermediate support therefor, and requiring only a single mounting pin 27ª that is received through an opening at the central pivot point of the middle bars 1.

From the above detail description of the device, it is believed that the construction and operation thereof will at once be apparent, it being noted that the device when employed as a luggage carrier, has the roller casters 25 removed therefrom by releasing the latch devices 23 and 23ª, while if desired, the head rest including the spring plate 19 may permanently remain in position. It is also intended that the frame structure may be detached from the running board B while the clamps 10 may permanently remain thereon if desired. In the use of the device as a rest, the lazy tong arrangement of crossed bars 1 is retained in a closed position by the tensioned dogs 16 as shown in Figs. 1 and 7, while the roller casters are easily and quickly mounted thereon, and as readily disengaged.

While there is herein shown and described the preferred embodiment of the present invention, it is nevertheless to be understood that minor changes may be made therein without departing from the spirit and scope thereof as claimed.

What is claimed as new is:—

1. In a rest of the type described, a lazy tong construction, end bars connected thereto, latch devices carried by said construction, casters detachably mounted on the end bars and lazy tong construction and retained in operative position by the latch devices, said casters including annularly grooved pins projecting upwardly therefrom to be engaged by the latch devices.

2. In a rest of the type described, a lazy tong construction, end bars connected thereto, latch devices carried by the lazy tong construction, casters detachably mounted on said construction and retained in operative position by the latch devices, said casters including annularly grooved pins projecting upwardly therefrom and said latch devices including disk heads carried by the construction and latch arms pivoted on the heads engageable with the grooved portions of the pins.

In testimony whereof I affix my signature.

FRANK W. MILOSY.